United States Patent
Fukuda et al.

(10) Patent No.: US 7,092,607 B2
(45) Date of Patent: Aug. 15, 2006

(54) OPTICAL WAVEGUIDE DEVICE, AND METHOD OF MANUFACTURING OPTICAL WAVEGUIDE DEVICE

(75) Inventors: Chie Fukuda, Yokohama (JP); Tetsuya Hattori, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/046,859

(22) Filed: Feb. 1, 2005

(65) Prior Publication Data

US 2005/0169592 A1 Aug. 4, 2005

(30) Foreign Application Priority Data

Feb. 4, 2004 (JP) ............................... 2004-027518

(51) Int. Cl.
  *G02B 6/10* (2006.01)
  *C23C 16/00* (2006.01)
(52) U.S. Cl. ................................. 385/129; 427/255.28
(58) Field of Classification Search ........ 385/129–131; 427/255.28, 574–578
See application file for complete search history.

(56) References Cited

U.S. PATENT DOCUMENTS 5,916,820 A * 6/1999 Okumura et al. ........... 438/694
6,803,080 B1 * 10/2004 Kondo et al. ............... 427/574

FOREIGN PATENT DOCUMENTS

| JP | 05-241035 A | 9/1993 |
| JP | 10-221557 A | 8/1998 |
| JP | 08-262250 A | 10/1998 |
| JP | 08-262260 A | 10/1998 |

OTHER PUBLICATIONS

K. Tanaka N. Kitano, H. Komano, H. Ishikawa, T. Chiba, K. Maru, S. Kashiimura, H. Okano, Novel spot also converter for high a waveguides. General Conference of The Institute of Electronics, Information and Communication Engineers 2003, p. 214, Japan.

* cited by examiner

*Primary Examiner*—Sung Pak
*Assistant Examiner*—Tina M. Wong
(74) *Attorney, Agent, or Firm*—Shinjyu Global IP Counselors (57) ABSTRACT

The present invention provides a glass optical waveguide device that comprises silica glass and is usable despite a relatively large refractive index difference between its core layer and cladding layer, and a method of manufacturing such device. This optical waveguide device includes a core layer on or over a substrate and a cladding layer that covers the core layer, wherein the core layer is made of silica glass containing an additive for raising the refractive index, and the relative refractive index difference of the core layer with respect to the cladding layer is at least 2.5%. The method of manufacturing this optical waveguide device includes the steps of placing a substrate over an electrode plate that is connected to a first high-frequency power supply within a vacuum vessel, introducing a raw material gas into the vacuum vessel and generating a plasma within the vacuum vessel with high-frequency power supplied from a second high-frequency power supply, and simultaneously forming an optical waveguide film over the substrate while supplying high-frequency power from the first high-frequency power supply to the electrode plate.

3 Claims, 7 Drawing Sheets

ND METHOD OF MANUFACTURING OPTICAL
OPTICAL WAVEGUIDE DEVICE, AND METHOD OF MANUFACTURING OPTICAL WAVEGUIDE DEVICE

BACKGROUND OF THE INVENTION

1. Field of the Invention

The present invention relates to an optical waveguide device used in optical information processing, optical communications, and so forth, and to a method of manufacturing such device. More particularly the present invention relates to an optical waveguide device that comprises silica glass and has a large refractive index difference between its core layer and cladding layer, and to a method of manufacturing such device.

2. Description of the Related Art

Flame hydrolysis deposition (FHD) and plasma CVD are two of the known methods of forming on a substrate an optical waveguide film that serves as the core layer of an optical waveguide device. FHD involves creating a porous film by subjecting silicon tetrachloride ($SiCl_4$) to flame hydrolysis and depositing the resulting silica glass microparticles on a substrate, and then consolidating this porous film at a high temperature of at least 1000° C., thereby obtaining an optical waveguide film. Plasma CVD involves generating a plasma in a vacuum vessel, activating within this plasma a reaction gas introduced into the vacuum vessel, and depositing an optical waveguide film on a substrate that has been placed in the vacuum vessel.

There are two known types of plasma CVD methods, depending on how the plasma is generated. The first method is parallel plate plasma CVD, which is disclosed in Japanese Patent Application Laid-Open NO. H08-262260. In this method, a substrate is placed between an upper electrode plate and a lower electrode plate disposed parallel to each other in a vacuum vessel, and high-frequency power is supplied to either the upper or lower electrode plate, which generates a plasma between the upper and lower electrode plates. The second method is inductively coupled plasma CVD, which is disclosed in Japanese Patent Applications Laid-Open H08-262250 and H10-221557. In this method, high-frequency power is supplied to a coil disposed outside a vacuum vessel, and a plasma is generated inside the vacuum vessel by the inductive electrical field thus formed.

It is important to make the size of an optical waveguide device compact. To this end, loss must be reduced by setting a great refractive index difference between the core layer and the cladding layer. However, the following problems are encountered with the methods mentioned above.

In FHD, if a core waveguide film is formed on a substrate in a manner such that it contains a large amount of additive for controlling the refractive index in order to increase the refractive index difference between the core layer and the cladding layer, the difference in the coefficients of thermal expansion between the substrate and the core waveguide film causes overall warping. Warping can lead to cracking of the substrate or to a marked decrease in the working precision of an optical circuit in the patterning of the optical circuit. Consequently, there is a limit to how much the refractive index difference can be increased. Also, in the process of consolidating the core waveguide film, because the core waveguide film is porous, and because the heat treatment temperature is 1000° C. or higher, the refractive index-controlling additive added to the core waveguide film tends to volatilize. This makes it difficult to obtain a core layer with a high refractive index, and the limit to the relative refractive index difference of the core layer with respect to the cladding layer is about 1%.

In plasma CVD, an optical waveguide film is formed on a substrate at a relatively low temperature, about 400° C., and the above-mentioned problem of warping encountered with FHD is generally considered not to apply. Also, since the core waveguide film formed on the substrate is transparent and solid, there is no need for a consolidation process, nor is there any volatilization of the additive for controlling the refractive index. Nevertheless, the inventors of the present invention found that when a core waveguide film containing a large quantity of additive for increasing the refractive index is formed on a substrate by a conventional plasma CVD method, tensile stress sometimes occurs in the core waveguide film with respect to a cross section perpendicular to the substrate.

Japanese Patent Application Laid-Open NO. H5-241035 discloses an optical waveguide device in which the core layer is made of a glass other than silica glass (that is, mainly made of $SiO_xN_yH_z$), and the refractive index difference between the core layer and the cladding layer is set high.

SUMMARY OF THE INVENTION

It is an object of the present invention to provide a glass optical waveguide device that is composed of silica glass and is practical despite a relatively large refractive index difference between its core layer and cladding layer, and a method of manufacturing this device.

To achieve the stated object, the present invention provides an optical waveguide device comprising a core layer on a substrate and a cladding layer that covers said core layer. In this optical waveguide device, the core layer is made of silica glass containing an additive for raising the refractive index, and the relative refractive index difference of the core layer with respect to the cladding layer is at least 2.5%.

In addition, the present invention provides a method of manufacturing an optical waveguide device, comprising the steps of placing a substrate over an electrode plate that is within a vacuum vessel and connected to a first high-frequency power supply which supplies high-frequency power of a first frequency, introducing a raw material gas into the vacuum vessel and generating a plasma within the vacuum vessel with high-frequency power of a second frequency that is different from the first frequency supplied from a second high-frequency power supply, and simultaneously forming an optical waveguide film over the substrate while supplying high-frequency power from the first high-frequency power supply to the electrode plate.

Advantages of the present invention will become apparent from the following detailed description, which illustrates the best mode contemplated to carry out the invention. The invention is capable of other and different embodiments, the details of which are capable of modifications in various obvious respects, all without departing from the invention. Accordingly, the accompanying drawing[s] and description are illustrative in nature, not restrictive.

BRIEF DESCRIPTION OF THE DRAWINGS

The present invention is illustrated by way of example, and not by way of limitation, in the figures of the accompanying drawings in which like reference numerals refer to similar elements.

DESCRIPTION OF THE PREFERRED EMBODIMENTS

Figure 1:
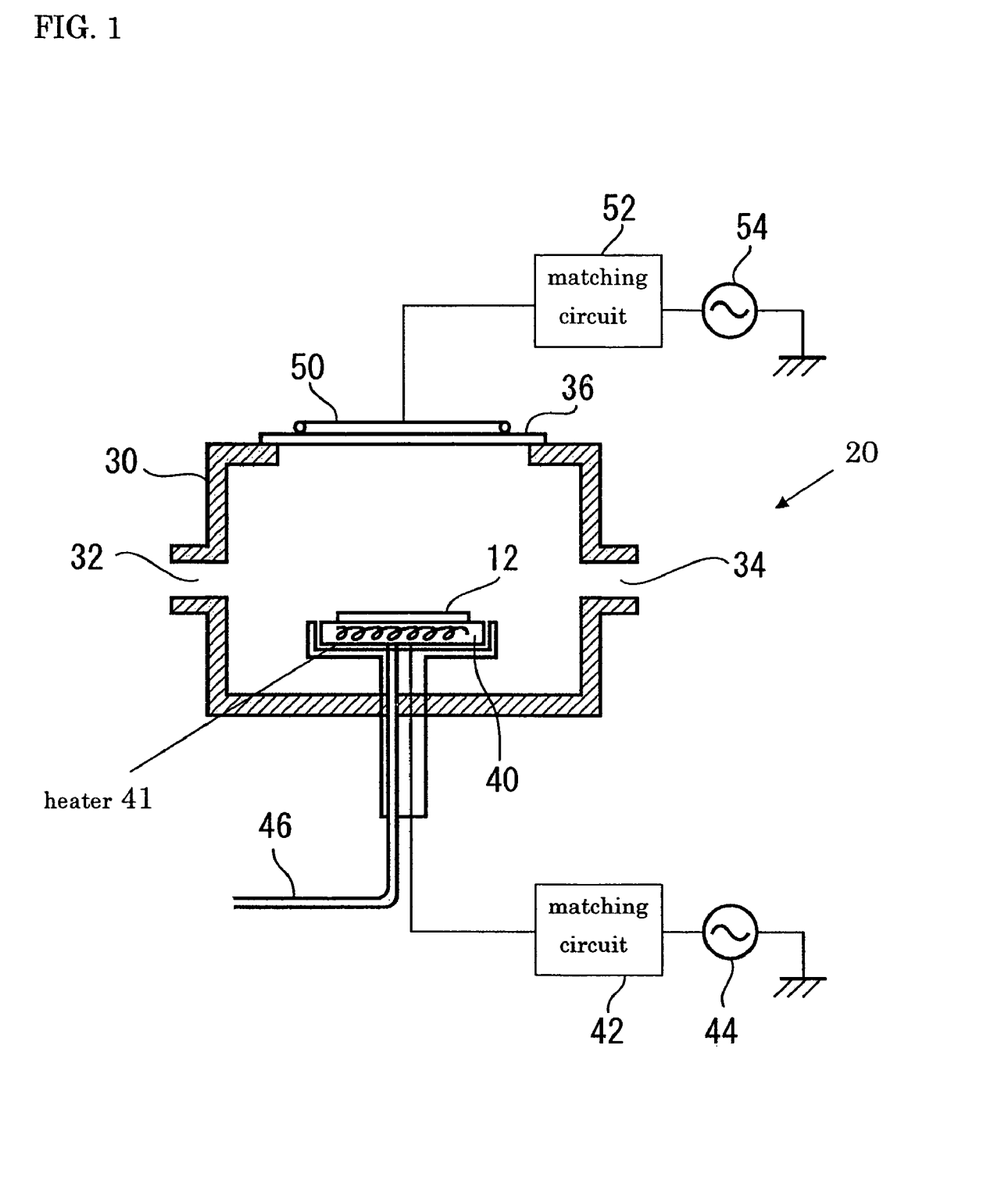
FIG. 1 is a schematic diagram of a plasma CVD apparatus suited to carrying out the method of the present invention of manufacturing an optical waveguide device.

FIG. 1 is a schematic diagram of a plasma CVD apparatus suited to carrying out the method of manufacturing an optical waveguide device of the present invention. The plasma CVD apparatus 20 is an apparatus for performing an inductively coupled plasma CVD method, and has a vacuum vessel 30. The vacuum vessel 30 has a gas introduction port 32, a gas exhaust port 34, and a high-frequency wave introduction window 36. Oxygen gas, an organosilicon compound gas, and an organometallic gas are introduced through the gas introduction port 32 into the vacuum vessel 30. The gases inside the vacuum vessel 30 are discharged through the gas exhaust port 34. The high-frequency wave introduction window 36 allows a high-frequency electromagnetic field generated by a coil 50 provided on the outside of the vacuum vessel 30 to be transmitted into the vacuum vessel 30.

An electrode plate 40 on which a substrate 12 is placed is provided inside and near the bottom of the vacuum vessel 30. The electrode plate 40 is connected to a first high-frequency power supply 44 via a matching circuit 42, and is also connected to a cooling water circulation pipe 46 and a heater 41. The purpose of the matching circuit 42 is to match the impedance between the high-frequency power supply 44 and the electrode plate 40. The purpose of the cooling water circulation pipe 46 and the heater 41 is to adjust the temperature of the electrode plate to about 100° to 600° C.

The purpose of the coil 50, which is provided at the top of the vacuum vessel 30 and near the high-frequency wave introduction window 36, is to generate an inductively coupled high-frequency plasma inside the vacuum vessel 30, and is connected to a second high-frequency power supply 54 via a matching circuit 52. The purpose of the matching circuit 52 is to match the impedance between the high-frequency power supply 54 and the coil 50.

Figure 2A:
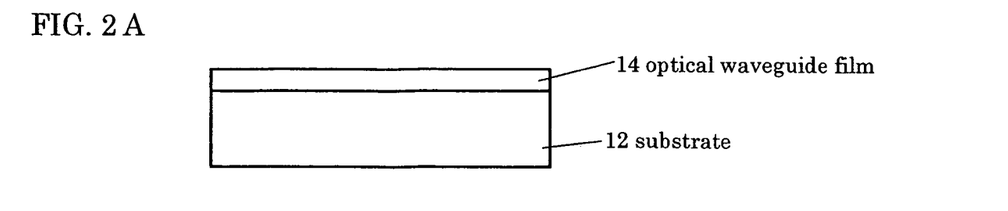
FIGS. 2A to 2E are cross sections of the optical waveguide device at various steps of an embodiment pertaining to the method of the present invention of manufacturing an optical waveguide device.
Figure 2B:
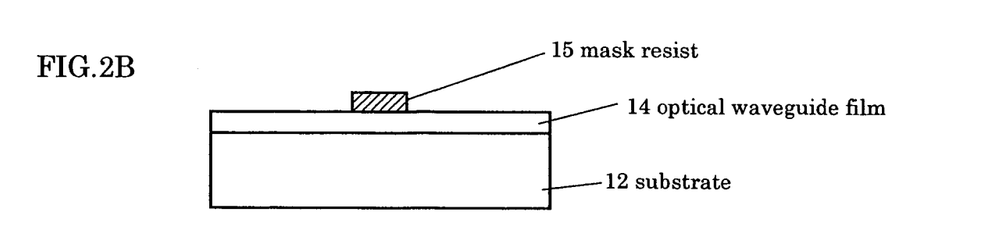
Figure 2C:
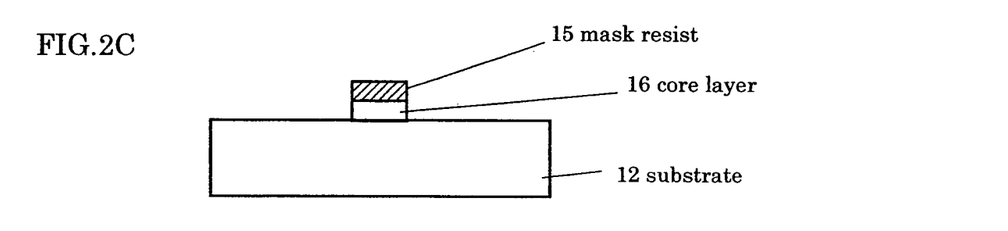
Figure 2D:
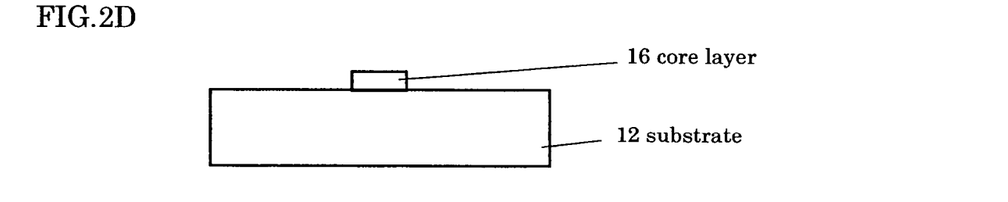
Figure 2E:
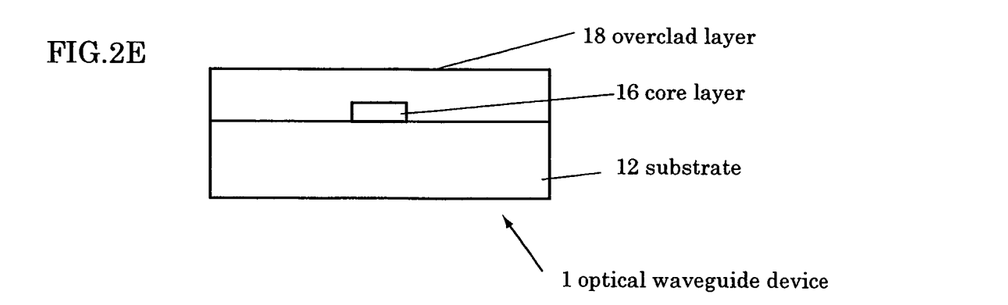

Embodiment of the Method of the Present Invention of Manufacturing an Optical Waveguide Device An embodiment of the method of the present invention of manufacturing an optical waveguide device can be broadly divided into three steps, comprising an optical waveguide film formation step, a core layer formation step, and an overcladding layer formation step. FIGS. 2A to 2E are cross sections of the optical waveguide device at each step in an embodiment of the method of the present invention of manufacturing an optical waveguide device. At the point when the optical waveguide film formation step is completed, the optical waveguide film 14 has been formed on the substrate 12 (FIG. 2A). After this, the optical waveguide film 14 formed on the substrate 12 is subjected to heat treatment (annealing) for a specific length of time at a temperature of about 1000° C. in an oxygen atmosphere. In the core layer formation step, a resist 15 applied to the surface is exposed through a mask using standard photolithographic technology, and an optical circuit having the same shape as the mask is transferred (FIG. 2B). After this, the resist 15 is used as a mask to etch the optical waveguide film 14 so as to form a core layer 16 (FIG. 2C). The mask resist 15 is then removed (FIG. 2D), after which an overcladding layer 18 is formed over the core layer 16 and the substrate 12 in the overcladding layer formation step (FIG. 2E). Annealing may be performed after the mask resist 15 has been removed (FIG. 2D).

In the optical waveguide film formation step, the optical waveguide film 14 is formed over the substrate 12. First, the substrate 12 (such as a quartz glass substrate) is placed on the electrode plate 40, after which the vacuum vessel 30 is sealed and the electrode plate 40 is kept at a constant temperature of 400° C., for example, by circulating cooling water through the cooling water circulation pipe 46 and adjusting the temperature of the heater. The inside of the vacuum vessel 30 is evacuated to $10^{-5}$ Pa or less with a vacuum pump connected to the gas exhaust port 34.

Then, oxygen gas ($O_2$), tetraethoxysilane (TEOS, used as an organosilicon compound gas), and tetramethylgermanium (TMGe, used as an organometallic gas) are introduced into the vacuum vessel 30 through the gas introduction port 32. The flux ratio of the various raw materials here is set to $[O_2]:[TEOS]:[TMGe]=360:1:1.2$, and the pressure inside the vacuum vessel 30 after the gas introduction is set to 1 Pa.

Tetramethoxysilane or another such silicon alkoxide can also be used instead of TEOS as the organosilicon compound gas. Also, tetramethoxygermanium or another such germanium alkoxide can be used instead of TMGe as the organometallic gas containing germanium. As for other organometallic gases, alkoxides of titanium, phosphorus, aluminum, erbium, arsenic, gallium, sulfur, tin, zinc, and so on are also preferable. The ratio in which the organosilicon compound gas and the organometallic gas are introduced is suitably adjusted according to the desired refractive index of the optical waveguide film 14 formed on the substrate 12.

Simultaneously with the introduction of the gases, high-frequency power (a frequency of 13.56 MHz and an output power of 1000 W, for example) is supplied to the coil 50 by the second high-frequency power supply 54. When high-frequency power is supplied to the coil 50, a high-frequency electromagnetic field is generated by electromagnetic induction, and this high-frequency electromagnetic field is transmitted through the high-frequency wave introduction window 36, so that a high-frequency electromagnetic field is also produced in the space inside the vacuum vessel 30. This high-frequency electromagnetic field heats the gases inside the vacuum vessel 30 to a high temperature and ionizes them, resulting in a plasma. Once they become a plasma, these gases react, the result being that a silicon dioxide doped with the metal element contained in the organometallic gas is formed as the optical waveguide film 14 on the substrate 12.

At the same time, the first high-frequency power supply 44 supplies high-frequency power (output power of 50 to 500 W) to the electrode plate 40. The frequency of the high-frequency power supplied to the electrode plate 40 is preferably no higher than 400 kHz. At the same time, it is preferable for the amount of high-frequency power supplied to the electrode plate 40 to be adjusted so that the stress of the optical waveguide film 14 with respect to a cross section perpendicular to the substrate 12 is within a specific range.

In the plasma, the raw material gases are dissociated into electrons and ions of the raw material gases, and when high-frequency power is applied to the electrode plate 40 on which the substrate 12 is placed, these electrons and ions are attracted to the substrate 12, allowing the plasma density over the substrate 12 to be increased.

This plasma density over the substrate 12 is related to the frequency of the high-frequency power supplied to the electrode plate 40. That is, electrons and ions respond differently to a high-frequency electromagnetic field; at a relatively high frequency, electron displacement conforms to changes in an AC electromagnetic field, whereas ions, which have a greater mass than electrons, cannot be displaced according to changes in an AC electromagnetic field, so only the electrons collide with the electrode plate 40, whereby the surface of the substrate 12 is charged to a negative potential. As a result, positive ions (such as silicon ions ($Si^{4+}$) or germanium ions ($Ge^{4+}$)) are attracted by electrostatic force to the substrate 12, and the density of these ions increases, but negative ions such as oxygen ions ($O^{2-}$) are not attracted to the substrate 12.

In contrast, when the frequency of the high-frequency power is 400 kHz or lower, the ions will be displaced and follow the AC electromagnetic field along with the electrons, and will therefore collide with the electrode plate 40 or with the substrate 12 placed thereon, allowing the plasma density over the substrate 12 to be increased and making it possible for a solid optical waveguide film 14 to be formed at a high rate.

The density and velocity of the positive and negative ions that collide with the substrate 12 can also be varied with the amount of high-frequency power supplied to the electrode plate 40. If several hundred watts of power are supplied, the amount of ions made to collide by the AC electromagnetic field will be greater than the amount of ions attracted by electrostatic force. As a result, the stress of the optical waveguide film 14 with respect to a cross section perpendicular to the substrate 12 can be varied. Furthermore, since there is a higher density of oxygen ions (negative ions) along with the positive ions that make up the plasma ions colliding with the substrate 12, this promotes the oxidation reaction that forms a glass waveguide film, and improves the quality of the glass waveguide film formed on the substrate 12. As a result, an optical waveguide film 14 that is solid and has low transmission loss can be obtained.

The raw material gases are oxygen gas, an organosilicon compound gas, and an organometallic gas at least containing germanium, and it is preferable for an inductively coupled high-frequency plasma to be used as the means for generating a plasma. The gases are easy to handle with this method, which greatly facilitates the work. In addition, the plasma density inside the vacuum vessel can be higher than with parallel plate plasma CVD, so less time is needed to form the optical waveguide film 14, and the organometallic gas containing an additive for raising the refractive index can be decomposed in a higher proportion, so it is easier to form an optical waveguide film 14 containing a high concentration of $GeO_2$, which is the additive for raising the refractive index. As a result, an optical waveguide device with a large relative refractive index difference of the core layer with respect to the cladding layer can easily be formed.

The additive to the core layer for raising the refractive index is preferably germanium dioxide ($GeO_2$). The use of $GeO_2$ is well established, so $GeO_2$ is easy to handle and an optical waveguide device that is low in cost can be obtained.

Figure 3:
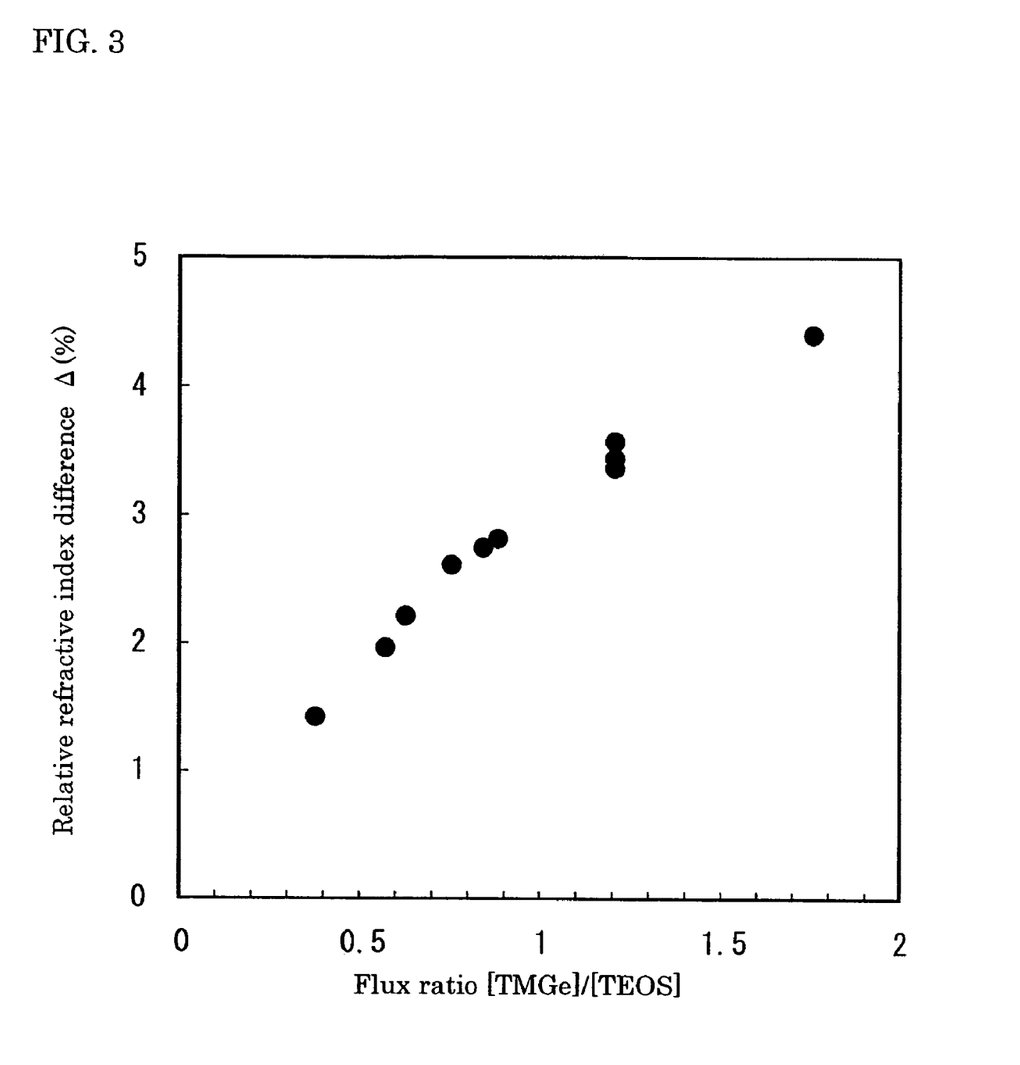
FIG. 3 is a graph that plots the relationship between the flux ratio [TMGe]/[TEOS] and the relative refractive index difference Δ of the optical waveguide film with respect to the substrate, when the flux of TMGe and the flux of TEOS in an embodiment were varied.

The relationship between the organometal flux and the refractive index of the optical waveguide film 14 will now be described in order to examine the characteristics of the optical waveguide film 14 formed by the above method. FIG. 3 is a graph that plots the relationship between the flux ratio [TMGe]/[TEOS] and the relative refractive index difference Δ of the optical waveguide film 14 with respect to the substrate 12, when the flux of TMGe and the flux of TEOS in an embodiment were varied. It can be seen that the relative refractive index difference Δ increases substantially proportionally to the flux ratio [TMGe]/[TEOS], and that the $GeO_2$ serving as the additive for raising the refractive index is efficiently added to the optical waveguide film 14 in proportion to the supplied amount of TMGe (the organometallic gas). When the flux ratio [TMGe]/[TEOS] is at least 0.5, the resulting optical waveguide film 14 will have a large relative refractive index difference Δ of at least 1.5% for the optical waveguide film 14 with respect to the substrate 12.

Figure 7:
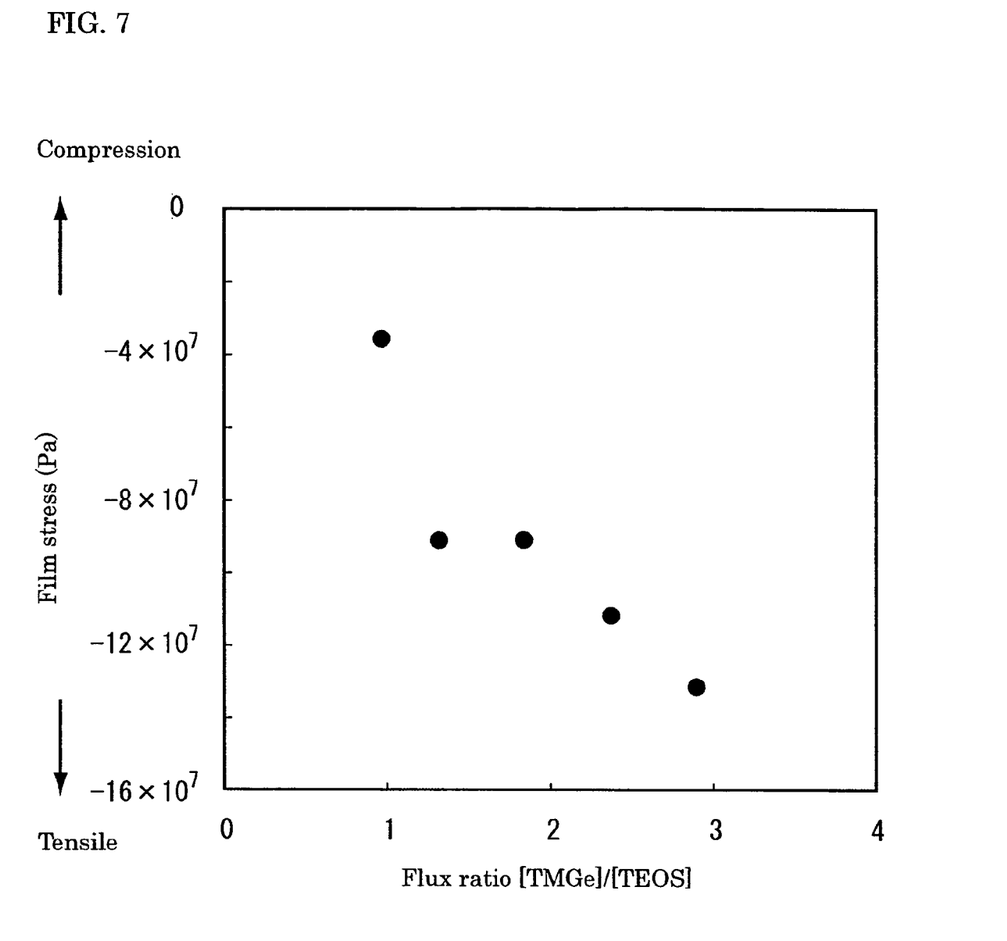
FIG. 7 is a graph that plots the relationship between the flux ratio [TMGe]/[TEOS] and the stress of the optical waveguide film with respect to a cross section perpendicular to the substrate, in an optical waveguide film manufactured by a conventional method of manufacturing an optical waveguide device.

Next, the relationship between the flux ratio [TMGe]/[TEOS] and the stress of the optical waveguide film 14 with respect to a cross section perpendicular to the substrate 12 will be described. First, in order to compare the relationship in the embodiment, we will describe the relationship when the optical waveguide film 14 is formed with the high-frequency power from the first high-frequency power supply 44 set to zero (conventional plasma CVD method). FIG. 7 is a graph that plots the relationship between the flux ratio [TMGe]/[TEOS] and the stress of the optical waveguide film with respect to a cross section perpendicular to the substrate, in an optical waveguide film manufactured by a conventional method of manufacturing an optical waveguide device. In the figures, the stress accompanied with a negative sign indicates tensile stress, and the stress accompanied with a positive sign indicates compressive stress.

The stress of the optical waveguide film with respect to a cross section perpendicular to the substrate is determined by the following formula (1) by measuring the warpage of the substrate immediately after the formation of the optical waveguide film.

$$\sigma = (\Delta\sigma/r^2) \times \{Es/3(1-\nu)\} \times (d_s^2/d_f) \quad (1)$$

Here, Δσ is the difference in the amount of substrate warping before and after the formation of the optical waveguide film, Es, ν, ds, and r are respectively the Young's modulus, Poisson's ratio, thickness, and radius of the substrate, and $d_f$ is the thickness of the optical waveguide film.

It can be seen from FIG. 7 that with an optical waveguide film formed by a conventional plasma CVD method, the stress with respect to a cross section perpendicular to the substrate is tensile stress, and that the higher the flux ratio [TMGe]/[TEOS] (that is, the larger the content of GeO$_2$ used as the additive for raising the refractive index), the greater the stress of the optical waveguide film with respect to a cross section perpendicular to the substrate.

Figure 4:
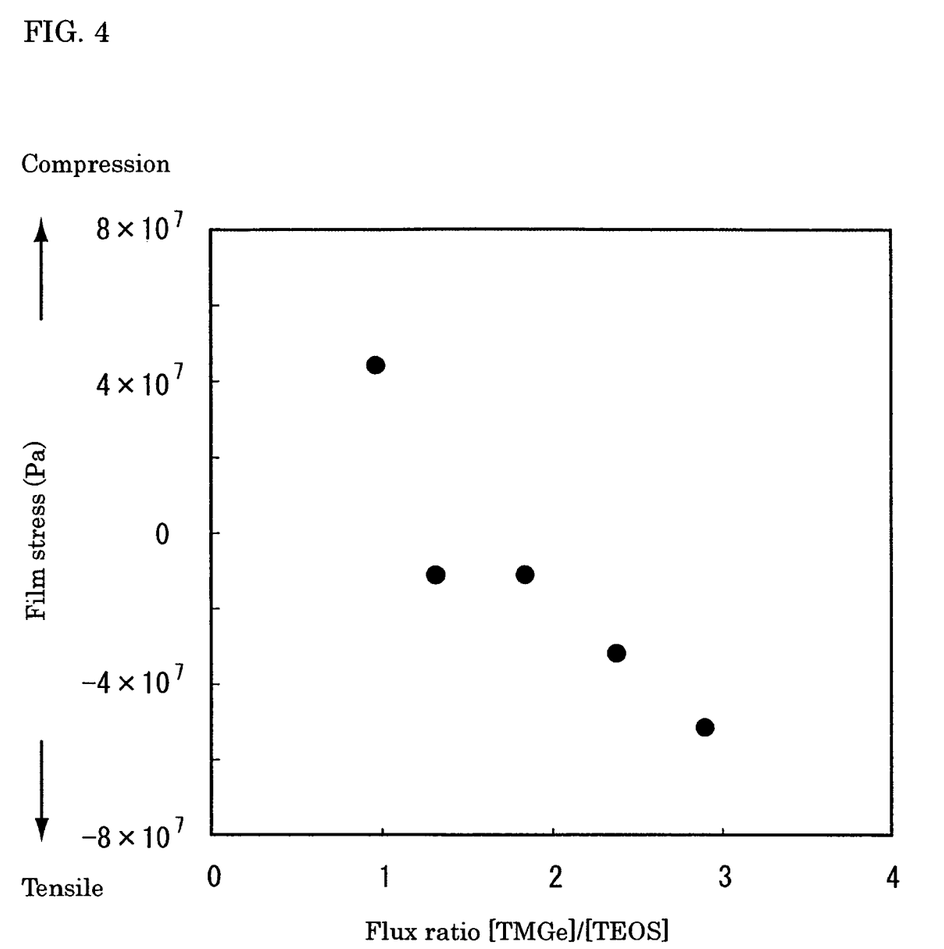
FIG. 4 is a graph that plots the relationship between the stress of the optical waveguide film with respect to a cross section perpendicular to the substrate, and the flux ratio [TMGe]/[TEOS] when values of power and frequency of the high-frequency power from the first high-frequency power supply 44 were set to 200 W and 140 kHz respectively in an embodiment.

FIG. 4 is a graph that plots the relationship between the flux ratio [TMGe]/[TEOS] and the stress of the optical waveguide film 14 with respect to a cross section perpendicular to the substrate 12 when values of power and frequency of the high-frequency power from the first high-frequency power supply 44 were set to 200 W and 140 kHz respectively in an embodiment of the present invention. Compared to the results in FIG. 7, the tensile stress of the optical waveguide film 14 with respect to a cross section perpendicular to the substrate 12 is lower over the entire range of the flux ratio [TMGe]/[TEOS]. Also, when the flux ratio [TMGe]/[TEOS] is approximately 1 or less, the stress can be changed from tensile stress to compressive stress. These results tell us that supplying high-frequency power from the high-frequency power supply 44 to the electrode plate 40 makes it possible to control the stress of the optical waveguide film 14 formed on the substrate 12 with respect to a cross section perpendicular to the substrate, and that tensile stress can be reduced.

Figure 5:
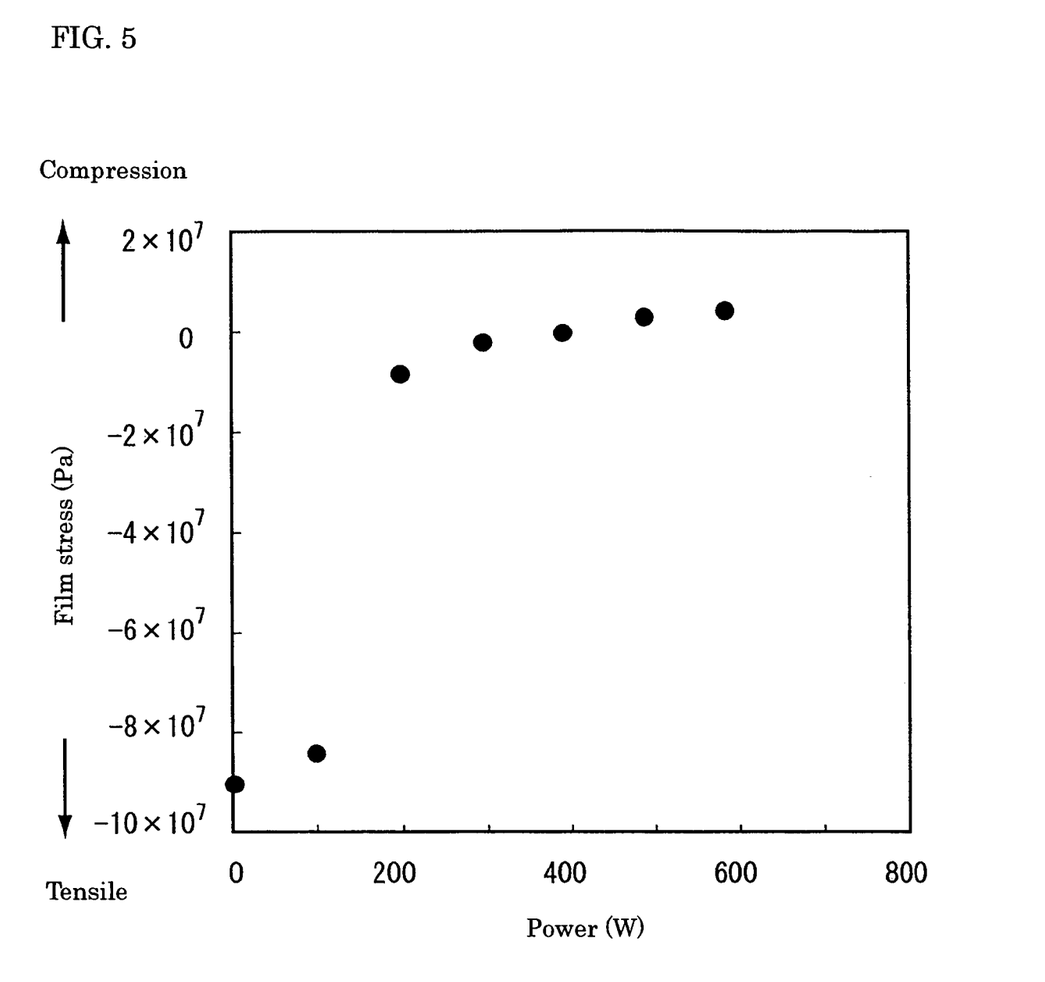
FIG. 5 is a graph that plots the relationship between the stress of the optical waveguide film 14 with respect to a cross section perpendicular to the substrate 12, and the output of a high-frequency power supply 44 when the flux ratio [TMGe]/[TEOS] was set to 1.2 and the high-frequency power from the high-frequency power supply 44 was set to a frequency of 140 kHz in an embodiment.

The relationship between the amount of high-frequency power from the first high-frequency power supply 44 and the stress of the optical waveguide film 14 with respect to a cross section perpendicular to the substrate 12 will now be described. FIG. 5 is a graph that plots the relationship between the output of the high-frequency power supply 44 and the stress of the optical waveguide film 14 with respect to a cross section perpendicular to the substrate 12 in the case where the flux ratio [TMGe]/[TEOS] was set to 1.2 and the high-frequency power from the high-frequency power supply 44 was set to a frequency of 140 kHz in an embodiment of the present invention. Varying the power of the high-frequency power supply 44 changed the stress of the optical waveguide film 14 with respect to a cross section perpendicular to the substrate 12, and when power of at least 200 W was supplied, the tensile stress dropped substantially to zero or became very slight compressive stress.

Exemplifying Embodiments

The optical waveguide film 14 is formed in a thickness of 2.5 μm on the substrate 12, with the flux ratio [TMGe]/[TEOS] set to 1.2 and while the high-frequency power is supplied from the first high-frequency power supply 44 to the electrode plate 40 at a frequency of 140 kHz and a power of 400 W. The refractive index of the optical waveguide film 14 with respect to light with a wavelength of 1550 nm is 1.500. After this, the substrate 12 on which the optical waveguide film 14 has been formed is annealed at 1000° C. in an oxygen atmosphere. The refractive index of the annealed optical waveguide film 14 is 1.495, or almost the same as before annealing.

Reactive ion etching (RIE) is then performed using C$_2$F$_6$ as the reaction gas and using a resist pattern obtained by ordinary photolithography as a mask such that the unnecessary portion of the optical waveguide film 14 is removed and patterning is done so as to obtain a core layer 16 of the required shape. The height of the core layer 16 is 3.0 μm.

Other gases containing fluorine, such as CF$_4$, C$_2$F$_6$ [sic], and CHF$_3$, can also be used instead of C$_2$F$_6$ as the reaction gas for RIE.

Finally, an overcladding layer formation step is carried out to form the overcladding layer 18 over the substrate 12 and the core layer 16. The substrate 12 on which the core layer 16 has been formed is placed on the electrode plate 40, an oxygen gas and an organosilicon compound gas are introduced into the vacuum vessel 30, high-frequency power is supplied by the second high-frequency power supply 54 to the coil 50, and this state is maintained for a specific length of time. Thus, an overcladding layer 18 composed of silicon dioxide and having a thickness of approximately 15 μm is formed over the substrate 12.

Figure 6:
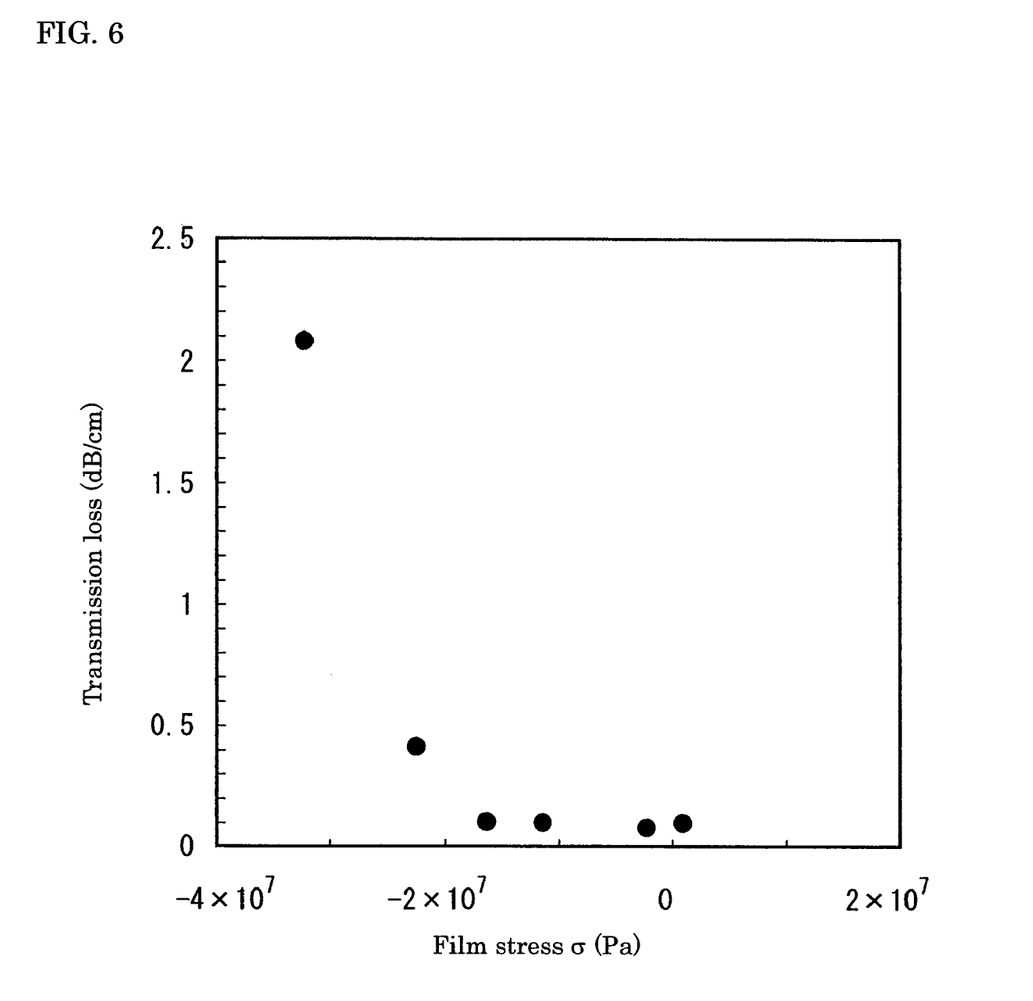
FIG. 6 is a graph that plots the relationship between transmission loss and the stress of the core layer of an optical waveguide with respect to a cross section perpendicular to the substrate 12 in the case where the optical waveguide was manufactured by a method of manufacturing an optical waveguide device according to an embodiment of the present invention.

With the optical waveguide device 1 manufactured as above, the relative refractive index difference Δ of the core layer with respect to the cladding layer is a large 3.4%, but the transmission loss is 0.1 dB/cm. FIG. 6 is a graph that plots the relationship between transmission loss and the stress of the core layer of an optical waveguide with respect to a cross section perpendicular to the substrate 12, which optical waveguide is manufactured by a method of manufacturing an optical waveguide device according to an embodiment of the present invention. If the relative refractive index difference Δ is large, in order to keep the transmission loss along the optical waveguide path to 0.2 dB/cm or less, the core waveguide film layer should be formed such that the stress of the core layer with respect to a cross section perpendicular to the substrate is compressive stress, or tensile stress of no more than $2\times10^7$ Pa. Also, cracks can be prevented from developing in the core waveguide film if the stress of the core waveguide film of the optical waveguide device with respect to a cross section perpendicular to the substrate 12 is either compressive stress, or tensile stress of no more than $2\times10^7$ Pa.

With the present invention, substrate warpage can be reduced even in an optical waveguide device having a large refractive index difference between the core layer and the cladding layer, and accordingly a very precise circuit pattern can be produced in the optical circuit pattern formation step following the optical waveguide film formation step. As a result, it is possible to provide an optical waveguide device having lower transmission loss.

In the embodiment described above, the method of manufacturing an optical waveguide device uses GeO$_2$ as an additive to be added to the core waveguide layer for raising the refractive index, but other additives instead of GeO$_2$ can also be used for raising the refractive index. An optical waveguide device may also be manufactured by adding an additive for decreasing the refractive index to the cladding layer, so that the refractive index of the cladding layer is lower than that of the core layer. The substrate does not need to be placed directly on the electrode plate, and may instead be disposed over it, with a suitable space therebetween.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

The entire disclosure of Japanese Patent Application No. 2004-027518 filed on Feb. 4, 2004, including specification, claims, drawings, and summary, is incorporated herein by reference in its entirety.

What is claimed is:

1. A method of manufacturing an optical waveguide device, comprising the steps of:
   placing a substrate over an electrode sheet that is within a vacuum vessel and connected to a first high-frequency power supply;
   introducing a raw material gas into the vacuum vessel and generating a plasma within the vacuum vessel with high-frequency power supplied from a second high-frequency power supply; and
   simultaneously forming an optical waveguide film over the substrate while supplying high-frequency power from the first high-frequency power supply to the electrode sheet;
   wherein the amount of high-frequency power supplied to the electrode sheet is adjusted such that the stress of the optical waveguide film in relation to a cross section perpendicular to the substrate is adjusted to within a specific range.

2. The method of manufacturing an optical waveguide device according to claim 1,
   wherein the frequency of the high-frequency power supplied to the electrode sheet is 400 kHz or lower.

3. The method of manufacturing an optical waveguide device according to claim 1,
   wherein the raw material gas is oxygen gas, an organo-silicon compound gas, and an organometal gas containing at least germanium, and the plasma is an inductive coupled high-frequency plasma.

* * * * *